(12) United States Patent
Qiu

(10) Patent No.: US 10,545,794 B2
(45) Date of Patent: Jan. 28, 2020

(54) BLOCKCHAIN-BASED DATA PROCESSING METHOD AND EQUIPMENT

(71) Applicant: Alibaba Group Holding Limited, George Town (KY)

(72) Inventor: Honglin Qiu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/508,715

(22) Filed: Jul. 11, 2019

(65) Prior Publication Data
US 2019/0332430 A1    Oct. 31, 2019

Related U.S. Application Data

(63) Continuation of application No. PCT/CN2018/080482, filed on Mar. 26, 2018.

(30) Foreign Application Priority Data

Mar. 28, 2017    (CN) .......................... 2017 1 0191658

(51) Int. Cl.
*G06F 9/46*    (2006.01)
*G06F 9/48*    (2006.01)
*G06F 16/182*    (2019.01)
*H04L 9/06*    (2006.01)

(52) U.S. Cl.
CPC ............ *G06F 9/4881* (2013.01); *G06F 9/465* (2013.01); *G06F 16/1837* (2019.01); *H04L 9/0637* (2013.01)

(58) Field of Classification Search
None
See application file for complete search history.

(56) References Cited

U.S. PATENT DOCUMENTS

| 2005/0021562 A1 | 1/2005 | Idei et al. |
| 2007/0053352 A1 | 3/2007 | Corcoran |
| 2016/0292672 A1 | 10/2016 | Fay et al. |

FOREIGN PATENT DOCUMENTS

| CN | 101098295 | 1/2008 |
| CN | 101447940 | 6/2009 |
| CN | 101904106 | 12/2010 |
| CN | 106209877 | 12/2016 |
| CN | 106534085 | 3/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Gregory A Kessler
(74) *Attorney, Agent, or Firm* — Fish & Richardson P.C.

(57) ABSTRACT

A node in a blockchain network receives service data generated in a specified time period, where the service data comprises label information used to represent a processing priority of the service data. The node determines, when a new block is generated, a throughput that corresponds to the label information based on a predetermined mapping relationship between label information and a throughput. The node obtains service data that satisfies the throughput and that comprises the label information from a data processing set based on the throughput, where the service data is stored in the data processing set. The service data is stored in the new block.

18 Claims, 4 Drawing Sheets

(56) References Cited

FOREIGN PATENT DOCUMENTS

| CN | 107391526 | 11/2017 |
|----|-----------|---------|
| CN | 107391527 | 11/2017 |
| KR | 101701131 | 2/2017 |
| TW | 201608883 | 3/2016 |
| TW | 201627889 | 8/2016 |
| TW | 201636829 | 10/2016 |
| WO | 2009077007 | 6/2009 |

OTHER PUBLICATIONS

Nakamoto, "Bitcoin: A Peer-to-Peer Electronic Cash System," www.bitcoin.org, 2005, 9 pages.

Dong et al., "Theory, Application Fields and Challenge of the Blockchain Technology," Telecommunications Science, Dec. 2016, 32(12)20-25 (with English abstract).

PCT International Search Report and Written Opinion in International Application No. PCT/CN2018/080482, dated May 30, 2018, 9 pages (with partial English translation).

European Extended Search Report in European Patent Application No. 18775453.6, dated Oct. 7, 2019, 12 pages.

Gaetani et al., "Blockchain-based Database to Ensure Data Integrity in Cloud Computing Environments," Proceedings of the First Italian Conference of Cybersecurity, 2017, pp. 146-155.

BLOCKCHAIN-BASED DATA PROCESSING METHOD AND EQUIPMENT

CROSS-REFERENCE TO RELATED APPLICATIONS

This application is a continuation of PCT Application No. PCT/CN2018/080482, filed on Mar. 26, 2018, which claims priority to Chinese Patent Application No. 201710191658.9, filed on Mar. 28, 2017, and each application is hereby incorporated by reference in its entirety.

TECHNICAL FIELD

The present application relates to the field of Internet information processing technologies and the field of computer technologies, and in particular, to a blockchain-based data processing method and equipment.

BACKGROUND

The blockchain technology is also referred to as a distributed ledger technology. As a distributed Internet database technology, the blockchain technology is characterized by decentralization, transparency, non-tampering, and trustworthiness. A network constructed based on the blockchain technology can be referred to as a blockchain network. The blockchain network includes network nodes (which can also be referred to as a blockchain node, and is simply referred to as a node below). Each network node corresponds to at least one blockchain, and each blockchain includes at least one block.

When receiving data to be stored, the network node broadcasts the data to be stored to other network nodes in the blockchain network. Therefore, each network node in the blockchain network stores full data of the blockchain network, and data stored on one network node is consistent with that stored on another node.

Data is generally stored in the blockchain network in two stages: In a first stage, a node in the blockchain network receives data to be stored, and broadcasts the data all over the blockchain network. As such, each node in the blockchain network receives the data to be stored. In this case, each network node in the blockchain network writes the data to be stored in a cache. In a second stage, a network node in the blockchain network that obtains permission to store the data to be stored writes the data to be stored in a block when obtaining recording permission, and adds the block to an existing blockchain. It can be seen that the data is stored in the blockchain network by using an asynchronous writing policy.

However, in an actual service scenario, when service data is stored in a blockchain network by using an asynchronous writing policy, generally, a data pool queue is maintained in a first stage, and data to be stored is sequentially written into the data pool queue based on a timestamp of the data to be stored. As such, in a second stage, data to be stored in the data pool queue is written into a block based on a first in first out principle.

According to certain researches, in the previous method, there are the following problems in storing data in the blockchain network: For services with relatively high service priorities, service data processing efficiency is relatively low, and consequently processing efficiency of these services is relatively low.

SUMMARY

In view of the above, implementations of the present application provide a blockchain-based data processing method and equipment, to alleviate an existing-technology issue of low efficiency of processing service data with a relatively high service priority.

An implementation of the present application provides a blockchain-based data processing method, including the following: receiving, by a node in a blockchain network, at least one piece of service data generated in a specified time period, where the service data includes label information used to represent a processing priority of the service data; determining, by the node when a new block is generated, a throughput that corresponds to the label information based on a predetermined mapping relationship between label information and a throughput; obtaining, by the node, service data that satisfies the throughput and that includes the label information from a data processing set based on the throughput, where the received service data is stored in the data processing set; and storing the obtained service data in the block.

An implementation of the present application further provides a blockchain-based data processing device, including the following: a receiving unit, configured to receive at least one piece of service data generated in a specified time period, where the service data includes label information used to represent a processing priority of the service data; a determining unit, configured to determine, when a new block is generated, a throughput that corresponds to the label information based on a predetermined mapping relationship between label information and a throughput; an acquisition unit, configured to obtain service data that satisfies the throughput and that includes the label information from a data processing set based on the throughput, where the received service data is stored in the data processing set; and a processing unit, configured to store the obtained service data in the block.

At least one of the previously described technical solutions used in the implementations of the present application can achieve the following beneficial effects:

Throughputs are determined for service data with different processing priorities, and when service data is stored in a block, the service data with the different processing priorities is obtained, so that the service data with the different processing priorities can be processed, an existing-technology rule of processing service data based solely on time can be broken, and an existing-technology issue of low efficiency of processing a service with a relatively high service priority can be alleviated. The solution provided in implementations of the present application not only ensures efficiency of processing service data with a high processing priority, but also ensures efficiency of processing service data with a low processing priority. When a processing priority is satisfied, the flexibility of processing service data in a blockchain is increased, and the use value of the blockchain in the service application field is also improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
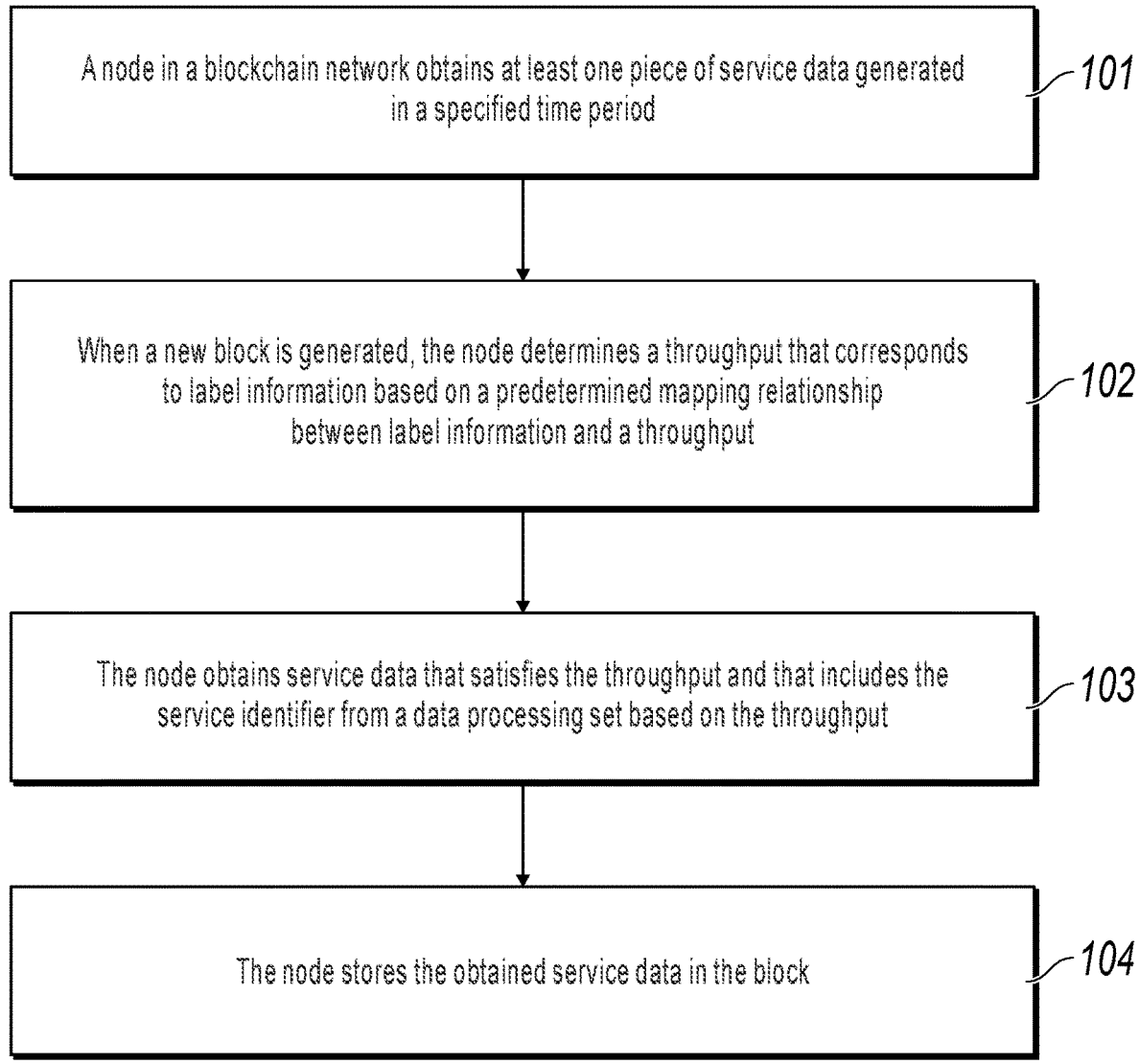
FIG. 1 is a schematic flowchart illustrating a blockchain-based data processing method, according to an implementation of the present application.

FIG. 1 is a schematic flowchart illustrating a blockchain-based data processing method, according to an implementation of the present application. The method can be described as follows. The execution body in this implementation of the present application can be any service node (which can also be referred to as a blockchain node, and is simply referred to as a node below) in a blockchain network, and is not limited here. In this implementation of the present application, an example that the execution body is a node is used for description in detail.

Step 101: A node in the blockchain network receives at least one piece of service data generated in a specified time period.

The service data includes label information used to represent a processing priority of the service data.

In this implementation of the present application, a processing priority can be set for service data generated for different services, and label information indicating a processing priority of service data is added to the service data when the service data is generated. As such, when the service data is received, the processing priority of the service data can be determined based on the label information. The processing priority here can also be referred to as a processing level. Implementations are not limited here.

In addition, in this implementation of the present application, the processing priority set for the service data can be determined based on a service type, or can be determined based on other factors. Implementations are not limited here. For example, processing priorities of different service data generated for the same service can be the same or can be different. Processing priorities of different service data generated for different services can be the same or can be different.

For example, first, service priorities can be determined for different services. Here, a service priority corresponds to a processing priority of service data, that is, a higher service priority indicates a higher service processing priority of the service data generated for the service. Then, one field can be added to the service data. The field can be referred to as label information, and is used to represent a processing priority of the service data.

Preferably, in the technical solution provided in this implementation of the present application, throughputs can be determined in advance for service data with different processing priorities, and a mapping relationship between label information that corresponds to a processing priority and a determined throughput is established.

Processing priorities of service data of different services are determined, and mapping relationships between different processing priorities and label information are determined. Throughputs that correspond to the processing priorities are determined based on the processing priorities. Mapping relationships between label information that corresponds to the processing priorities and the throughputs are established.

It is worthwhile to note that the throughput here can be a processing ratio or can be a processing quantity. Implementations are not limited here.

Table 1 is a table of a mapping relationship between label information and a throughput.

TABLE 1

| Processing priority | Label information | Throughput (here, a processing ratio is used as an example for description) |
|---|---|---|
| First priority | 10,000 | 30% |
| Second priority | 20,000 | 20% |
| Third priority | 30,000 | 10% |

It can be seen from Table 1 that if the label information included in the service data is 10,000, it indicates that the processing priority of the service data is the first priority, and the throughput for the processing priority is 30%. If the label information included in the service data is 20,000, it indicates that the processing priority of the service data is the second priority, and the throughput for the processing priority is 20%. If the label information included in the service data is 30,000, it indicates that the processing priority of the service data is the third priority, and the throughput for the processing priority is 10%. It is worthwhile to note that, the processing ratio shown in Table 1 uses a storage capacity of a block in a blockchain as a unit. Therefore, an amount of service data of a specific service that needs to be stored in the block can be obtained through calculation based on the throughput and the storage capacity of the block.

Preferably, in an implementation of the present application, throughputs of the same service data can be different in different time periods. That is, a plurality of processing priorities can be set for the same type of service data. As such, throughputs of the service data are different in different time periods.

Here, service data A is used as an example for description. In this implementation of the present application, assume that service data A belongs to the service data whose processing priority is the first priority. In this case, it can be specified that a throughput of service data A at any time can occupy 30% of the storage capacity of the block. In addition, the throughput of service data A can be dynamically adjusted.

For example, in time period T1, it is specified that service data A belongs to the service data whose processing priority is the second priority, and a throughput of service data A can occupy 30% of the storage capacity of the block. In time period T2, it is specified that service data A belongs to the service data whose processing priority is the first priority, and a throughput of service data A can occupy 50% of the storage capacity of the block. In time period T3, it is specified that service data A belongs to the service data whose processing priority is the third priority, and a throughput of service data A can occupy 10% of the storage capacity of the block. As such, in this implementation of the present application, a correspondence can be further established in advance among a time period, label information, and a throughput. For example, when the service data is generated, a time period that corresponds to the time of generating the service data is determined, and label information that corresponds to the time period is included in the service data.

Usually, fields in the service data include but are not limited to a hash value, a version number, a public key, a signature, a hash value of a block that the service data belongs, a timestamp (that is, a time when the node processes the service data), etc. In this case, the fields included in the service data described in this implementation of the present application include but are not limited to those shown in Table 2. Specific attributes of the fields are described in Table 2.

TABLE 2

| Field Name | Attribute Description |
| --- | --- |
| Hash value | Indicates a unique identifier of each piece of service data |
| Version number | Indicates a version identifier of a service data generation mechanism |
| Public key | Indicates a public key of a transaction initiation party |
| Signature | Indicates the information obtained by a service initiation party by signing with a private key, where if the signature is verified by a public key, it indicates that the service is valid |
| Service information | Indicates the specific service information that corresponds to the service data, such as a fund flow and a change of capital ownership, which is written by a transaction initiation party |
| Hash of a block that the service data belongs | Indicates the hash value of the block that the service data belongs if the service data is included in a consensus; and indicates null if the service data is not included in a consensus. |
| Timestamp | Indicates a time when the service data is processed by the node (determined in precision of milliseconds) |
| Service priority | Processing priorities are allocated to different services based on service attributes. A higher service priority indicates a higher processing priority. |
| Label information | Used to represent a processing priority of the service data |
| . . . | . . . |

Preferably, in this implementation of the present application, data processing sets can be further configured for service data with different processing priorities based on determined processing priorities. As such, when receiving the service data, the service data can be separately stored based on label information included in the service data. That is, service data that includes the same label information is stored in the same data processing set.

It is worthwhile to note that because there is a time interval between two adjacent blocks in a blockchain, this time interval can be used as a reference condition for setting a time period in this implementation of the present application. Implementations are not limited here.

Preferably, in this implementation of the present application, when the node receives the at least one piece of service data generated in the specified time period, the method further includes the following: determining the data processing set that corresponds to the label information based on the label information included in the service data; and storing the service data in the determined data processing set.

Figure 2:
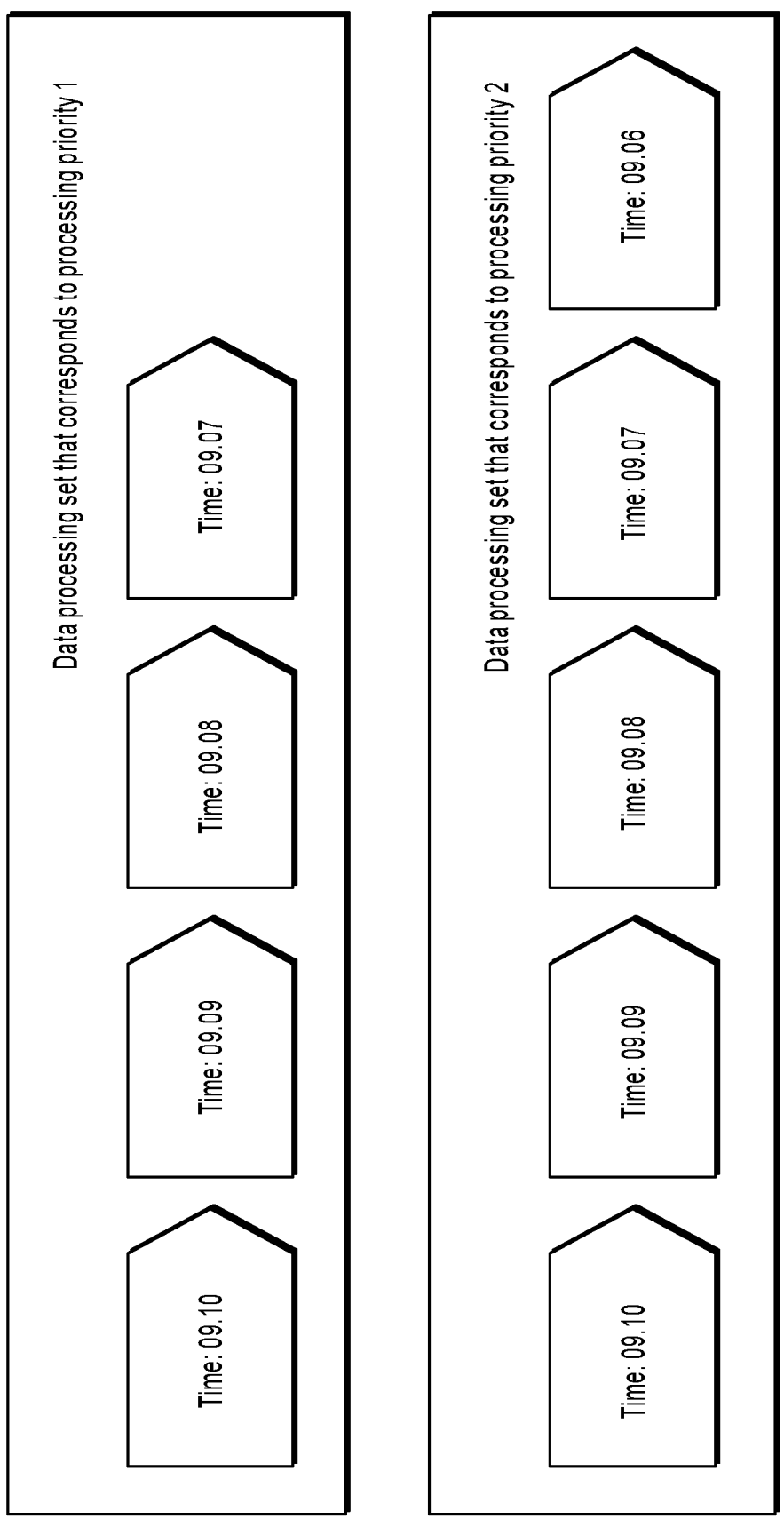
FIG. 2 is a schematic diagram illustrating a data processing set that corresponds to service data with different processing priorities, according to an implementation of the present application.

FIG. 2 is a schematic diagram illustrating a data processing set that corresponds to service data with different processing priorities, according to an implementation of the present application. It can be seen from FIG. 2 that two data processing sets are included. One data processing set corresponds to processing priority 1, that is, the service data that corresponds to processing priority 1 is stored in the data processing set. The other data processing set corresponds to processing priority 2, that is, the service data that corresponds to processing priority 2 is stored in the data processing set.

Step 102: When a new block is generated, the node determines a throughput that corresponds to label information based on a predetermined mapping relationship between label information and a throughput.

In this implementation of the present application, the predetermined mapping relationship between label information and a throughput can be established in the following method: determining processing priorities of service data of different services, and determining mapping relationships between different processing priorities and label information; determining throughputs that correspond to the processing priorities based on the processing priorities; and establishing mapping relationships between label information that corresponds to the processing priorities and the throughputs.

One piece of label information is randomly selected, and a throughput that corresponds to the label information is determined and selected based on the predetermined mapping relationship between label information and a throughput.

Here, label information can be selected based on order of processing priorities, and can be sequentially determined in descending order of processing priorities. Further, throughputs that correspond to different label information are determined in the previous method.

Step 103: The node obtains service data that satisfies the throughput and that includes the label information from a data processing set based on the throughput.

In this implementation of the present application, an amount of service data that includes the label information is determined based on the throughput and a storage capacity of the block.

The service data of the amount that includes the label information is obtained from the data processing set, where the received service data is stored in the data processing set.

For example, for service data to be processed, the throughput that corresponds to the label information can be determined based on the predetermined mapping relationship between label information and a throughput, for example, the throughput is p (as a percentage). In this case, in this implementation of the present application, a storage capacity of a newly generated block is determined. For example, if the storage capacity is x, it is determined that an amount of service data that corresponds to the label information that needs to be stored in the block is xp.

Preferably, when the new block is generated, if received service data corresponds to at least two different processing priorities, the node determines throughputs that correspond to label information of different processing priorities, where a sum of throughputs that correspond to different label information is less than or equal to a storage capacity of the block.

For example, assume that service data to be processed corresponds to a plurality of processing priorities (for example, processing priority 1 and processing priority 2). In this case, the throughput that corresponds to the label information is separately determined based on the predetermined mapping relationship between label information and a throughput. For example, the throughput that corresponds to the label information of processing priority 1 is p (as a percentage), and the throughput that corresponds to the label information of processing priority 2 is m (as a percentage).

For another example, assume that service data to be processed corresponds to a plurality of services (for example, service 1 and service 2, where the processing priority that corresponds to service 1 is processing priority 1, and the processing priority that corresponds to service 2 is processing priority 2). In this case, the throughput that corresponds to the label information is separately determined based on the predetermined mapping relationship between label information and a throughput. For example, the throughput that corresponds to the label information of service 1 is p (as a percentage), and the throughput that corresponds to the label information of service 2 is m (as a percentage).

In this implementation of the present application, a storage capacity of a newly generated block is determined. For example, if the storage capacity is x, it is determined that an amount of service data that corresponds to the label information of processing priority 1 that needs to be stored in the block is xp, and an amount of service data that corresponds to the label information of processing priority 2 that needs to be stored in the block is xm. It is worthwhile to note here that a sum of xm and xp is less than or equal to x.

In another case, some service data has relatively low processing priorities, and the system does not configure label information for the service data, or configures label information for the service data but does not determine a throughput for the service data. For this case, a processing method can be but is not limited to the following method: when the service data does not include label information, obtaining, based on an idle capacity of the block, service data that satisfies the idle capacity and does not include label information from the data processing set; or when a throughput that corresponds to the label information is null, obtaining, based on an idle capacity of the block, service data that satisfies the idle capacity and includes the label information from the data processing set.

For example, the received service data corresponds to a plurality of services (for example, service 1, service 2, and service 3) or a plurality of processing priorities. In this case, the throughput that corresponds to the label information is separately determined based on the predetermined mapping relationship between label information and a throughput. For example, the throughput that corresponds to the label information of service 1 is p (as a percentage), the throughput that corresponds to the label information of service 2 is m (as a percentage), and the throughput that corresponds to the label information of service 3 is null.

In this implementation of the present application, a storage capacity of a newly generated block is determined. For example, if the storage capacity is x, it is determined that an amount of service data that corresponds to the label information of service 1 that needs to be stored in the block is xp, an amount of service data that corresponds to the label information of service 2 that needs to be stored in the block is xm, and an amount of service data that corresponds to the label information of service 3 that needs to be stored in the block is (1−p−m)×x.

There is still another case in this implementation of the present application, that is, an amount of service data stored in the data processing set that corresponds to the label information is less than the throughput, which means that the service data stored in the data processing set cannot satisfy the requirement of the throughput. To implement proper use of resources, in this case, the service data is obtained from the data processing set based on the amount of service data stored in the data processing set. That is, all the service data stored in the data processing set is read.

In this implementation of the present application, service data that satisfies the throughput is obtained based on the throughput and a timestamp of service data from the data processing set that corresponds to the label information.

The service data that satisfies the throughput is obtained from the data processing set that corresponds to the label information based on order of a corresponding processing time of the service data.

Step 104: The node stores the obtained service data in the block.

In this implementation of the present application, the obtained service data is sequentially stored in the block based on the order of the corresponding processing time of the service data.

According to the technical solution provided in this implementation the present application, throughputs are determined for service data with different processing priorities, and when service data is stored in a block, the service data with the different processing priorities is obtained, so that the service data with the different processing priorities can be processed, an existing-technology rule of processing service data based solely on time can be broken, and an existing-technology issue of low efficiency of processing a service with a relatively high service priority can be alleviated. The solution provided in implementations of the present application not only ensures efficiency of processing service data with a high processing priority, but also ensures efficiency of processing service data with a low processing priority. When a processing priority is satisfied, the flexibility of processing service data in a blockchain is increased, and the use value of the blockchain in the service application field is also improved.

Figure 3:
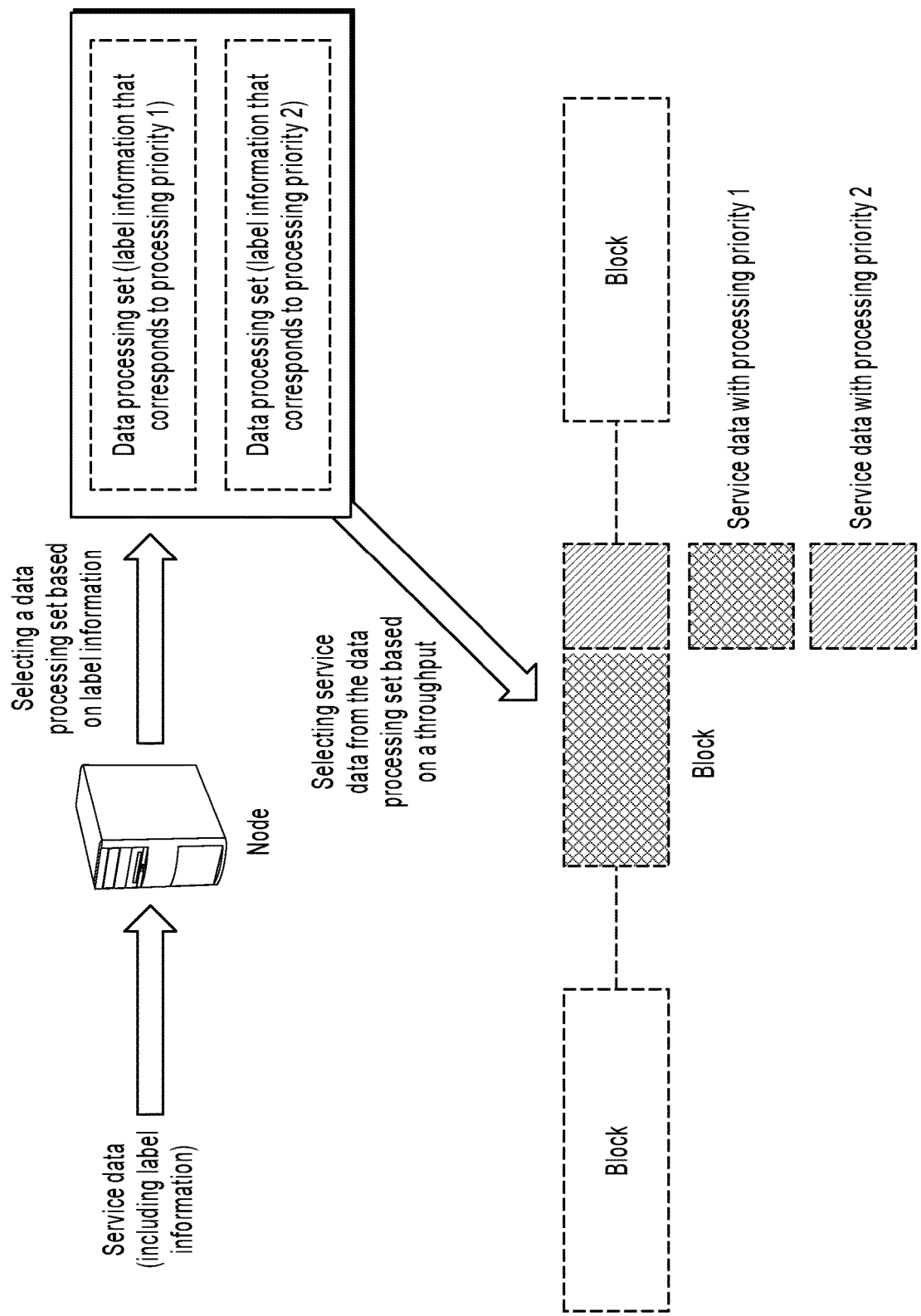
FIG. 3 is a diagram illustrating a scenario of a blockchain-based data processing method, according to an implementation of the present application.

FIG. 3 is a diagram illustrating a scenario of a blockchain-based data processing method, according to an implementation of the present application. It can be seen from FIG. 3 that when receiving service data, a node in a blockchain network determines label information of the service data. When a new block is generated, a processing quantity of service data can be determined based on a service processing priority of the service data, and the service data that satisfies the processing quantity is obtained from a cache and stored in the block (which is implemented in the way in steps 102 and 103 in the previous implementation).

Figure 4:
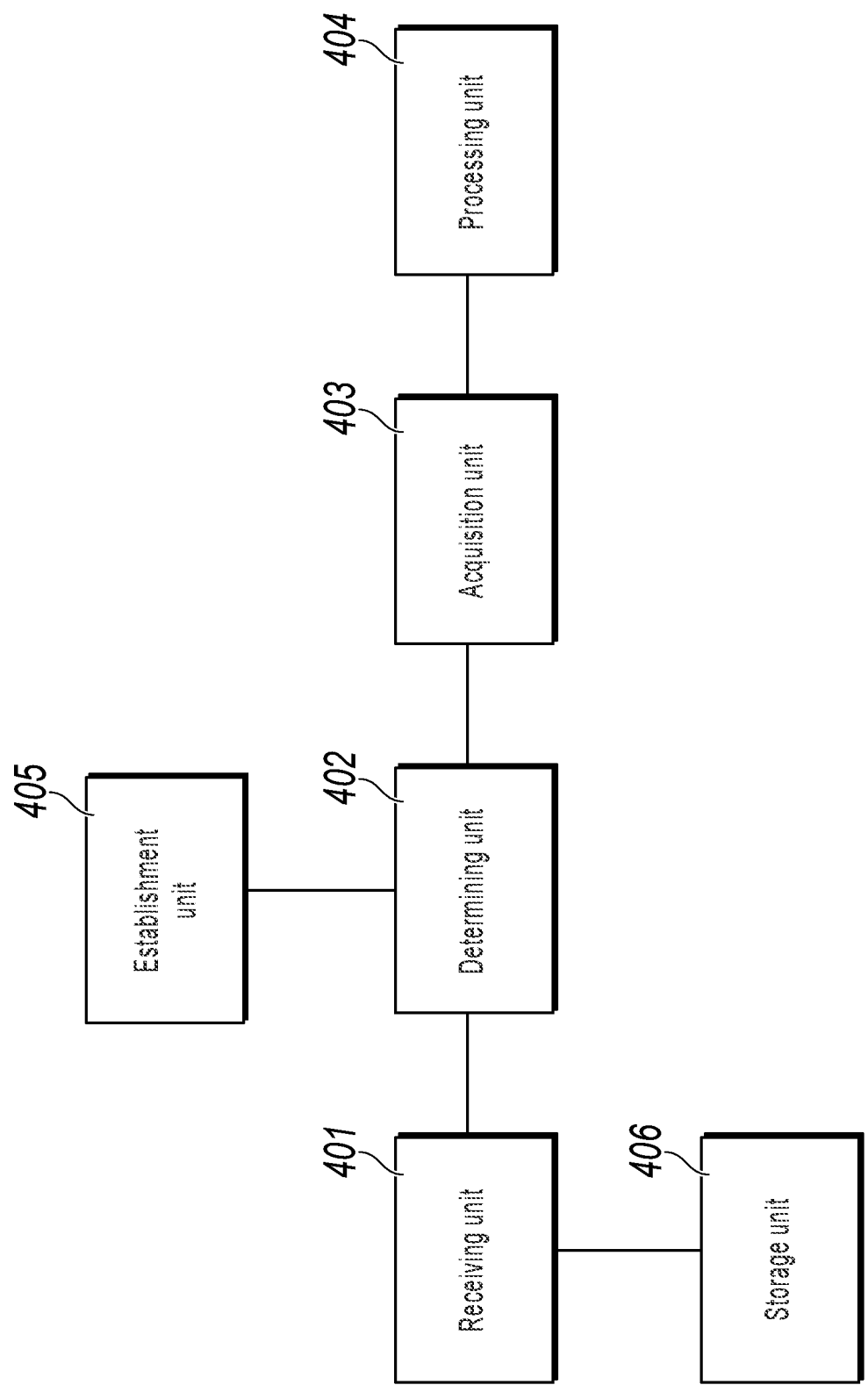
FIG. 4 is a schematic structural diagram illustrating a blockchain-based data processing device, according to an implementation of the present application.

FIG. 4 is a schematic structural diagram illustrating a blockchain-based data processing device, according to an implementation of the present application. The data processing device includes a receiving unit 401, a determining unit 402, an acquisition unit 403, and a processing unit 404.

The receiving unit 401 is configured to receive at least one piece of service data generated in a specified time period, where the service data includes label information used to represent a processing priority of the service data.

The determining unit 402 is configured to determine, when a new block is generated, a throughput that corresponds to the label information based on a predetermined mapping relationship between label information and a throughput.

The acquisition unit 403 is configured to obtain service data that satisfies the throughput and that includes the label information from a data processing set based on the throughput, where the received service data is stored in the data processing set.

The processing unit 404 is configured to store the obtained service data in the block.

In another implementation of the present application, the data processing device further includes an establishment unit 405.

The establishment unit 405 establishes the predetermined mapping relationship between label information and a throughput, including the following: determining processing priorities of service data of different services, and determining mapping relationships between different processing priorities and label information; determining throughputs that correspond to the processing priorities based on the processing priorities; and establishing mapping relationships between label information that corresponds to the processing priorities and the throughputs.

In another implementation of the present application, throughputs of the same service data are different in different time periods.

In another implementation of the present application, the acquisition unit 403 obtains service data that satisfies the throughput and that includes the label information from a data processing set based on the throughput, including the following: determining an amount of service data that includes the label information based on the throughput and a storage capacity of the block; and obtaining the service data of the amount that includes the label information from the data processing set.

In another implementation of the present application, the acquisition unit 403 obtains service data that satisfies the throughput and that includes the label information from a data processing set based on the throughput, including the following: when the service data does not include label information, obtaining, based on an idle capacity of the block, service data that satisfies the idle capacity and does not include label information from the data processing set; or when a throughput that corresponds to the label information is null, obtaining, based on an idle capacity of the block, service data that satisfies the idle capacity and includes the label information from the data processing set.

In another implementation of the present application, the data processing device further includes a storage unit 406.

When the node receives the at least one piece of service data generated in the specified time period, the storage unit 406 determines the data processing set that corresponds to the label information based on the label information included in the service data; and stores the service data in the determined data processing set.

In another implementation of the present application, the acquisition unit 403 obtains service data that satisfies the throughput and that includes the label information from a data processing set based on the throughput, including the following: obtaining service data that satisfies the throughput based on the throughput and a timestamp of service data from the data processing set that corresponds to the label information.

In another implementation of the present application, the acquisition unit 403 obtains service data that satisfies the throughput and that includes the label information from a data processing set based on the throughput, including the following: when an amount of service data stored in the data processing set that corresponds to the label information is less than the throughput, obtaining the service data from the data processing set based on the amount of service data stored in the data processing set.

In another implementation of the present application, the determining unit 402 determines, when a new block is generated, a throughput that corresponds to the label information based on a predetermined mapping relationship between label information and a throughput, including the following: when the new block is generated, if received service data corresponds to at least two different processing priorities, determining throughputs that correspond to label information of different processing priorities, where a sum of throughputs that correspond to different label information is less than or equal to a storage capacity of the block.

It is worthwhile to note that, the data processing device provided in this implementation of the present application can be implemented by using software or hardware. Implementations are not limited here. The data processing device described in this implementation of the present application determines throughputs for service data with different processing priorities, and when service data is stored in a block, obtains the service data with the different processing priorities, so that the service data with the different processing priorities can be processed, an existing-technology rule of processing service data based solely on time can be broken, and an existing-technology issue of low efficiency of processing a service with a relatively high service priority can be alleviated. The solution provided in implementations of the present application not only ensures efficiency of processing service data with a high processing priority, but also ensures efficiency of processing service data with a low processing priority. When a processing priority is satisfied, the flexibility of processing service data in a blockchain is increased, and the use value of the blockchain in the service application field is also improved.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions can be stored in a computer-readable memory that can instruct the computer or the other programmable data processing device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the computing device. Based on the definition in the present specification, the computer-readable medium does not include transitory computer-readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such a process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A blockchain-based data processing method, comprising:
   receiving, by a node in a blockchain network, service data generated in a specified time period, wherein the service data comprises label information used to represent a processing priority of the service data;
   determining, by the node when a new block is generated, a throughput that corresponds to the label information based on a predetermined mapping relationship between label information and a throughput;
   obtaining, by the node, service data that satisfies the throughput and that comprises the label information from a data processing set based on the throughput, wherein the service data is stored in the data processing set; and
   storing the service data in the new block.

2. The blockchain-based data processing method according to claim 1, wherein establishing the predetermined mapping relationship between label information and a throughput comprises:
   determining processing priorities of service data of different services;
   determining mapping relationships between different processing priorities and label information;
   determining throughputs that correspond to the processing priorities based on the processing priorities; and
   establishing mapping relationships between label information that corresponds to the processing priorities and the throughputs.

3. The blockchain-based data processing method according to claim 2, wherein throughputs of the same service data are different in different time periods.

4. The blockchain-based data processing method according to claim 1, wherein obtaining, by the node, service data that satisfies the throughput and that comprises the label information from a data processing set based on the throughput comprises:
   determining an amount of service data that comprises the label information based on the throughput and a storage capacity of the new block; and
   obtaining the amount of service data that comprises the label information from the data processing set.

5. The blockchain-based data processing method according to claim 1, wherein obtaining, by the node, service data that satisfies the throughput and that comprises the label information from a data processing set based on the throughput comprises:
   in response to determining that the service data does not comprise label information, obtaining, based on an idle capacity of the new block, service data that satisfies the idle capacity and does not comprise label information from the data processing set; or
   in response to determining that a throughput that corresponds to the label information is null, obtaining, based on an idle capacity of the new block, service data that satisfies the idle capacity and comprises the label information from the data processing set.

6. The blockchain-based data processing method according to claim 1, wherein when the node receives service data generated in the specified time period, the method further comprises:
   determining the data processing set that corresponds to the label information based on the label information comprised in the service data; and
   storing the service data in the data processing set.

7. The blockchain-based data processing method according to claim 6, wherein obtaining, by the node, service data that satisfies the throughput and that comprises the label information from a data processing set based on the throughput comprises:
   obtaining service data that satisfies the throughput based on the throughput and a timestamp of service data from the data processing set that corresponds to the label information.

8. The blockchain-based data processing method according to claim 6, wherein obtaining, by the node, service data that satisfies the throughput and that comprises the label information from a data processing set based on the throughput comprises:
   in response to determining that an amount of service data stored in the data processing set that corresponds to the label information is less than the throughput, obtaining the service data from the data processing set based on the amount of service data stored in the data processing set.

9. The blockchain-based data processing method according to claim 1, wherein the determining, by the node when a new block is generated, a throughput that corresponds to the label information based on a predetermined mapping relationship between label information and throughputs comprises:
   when the new block is generated, in response to determining that service data corresponds to at least two different processing priorities, determining throughputs that correspond to label information of different processing priorities, wherein a sum of throughputs that correspond to different label information is less than or equal to a storage capacity of the new block.

10. A blockchain-based data processing device, comprising:
    a receiving unit, configured to receive service data generated in a specified time period, wherein the service data comprises label information used to represent a processing priority of the service data;
    a determining unit, configured to determine, when a new block is generated, a throughput that corresponds to the label information based on a predetermined mapping relationship between label information and throughputs;

an acquisition unit, configured to obtain service data that satisfies the throughput and that comprises the label information from a data processing set based on the throughput, wherein the service data is stored in the data processing set; and a processing unit, configured to store the service data in the new block.

11. The blockchain-based data processing device according to claim 10, wherein the blockchain-based data processing device further comprises an establishment unit, wherein:

that the establishment unit establishes the predetermined mapping relationship between label information and throughputs comprises:

determining processing priorities of service data of different services;

determining mapping relationships between different processing priorities and label information;

determining throughputs that correspond to the processing priorities based on the processing priorities; and establishing mapping relationships between label information that corresponds to the processing priorities and the throughputs.

12. The blockchain-based data processing device according to claim 11, wherein throughputs of the same service data are different in different time periods.

13. The blockchain-based data processing device according to claim 10, wherein that the acquisition unit obtains service data that satisfies the throughput and that comprises the label information from a data processing set based on the throughput comprises:

determining an amount of service data that comprises the label information based on the throughput and a storage capacity of the new block; and obtaining the amount of service data that comprises the label information from the data processing set.

14. The blockchain-based data processing device according to claim 10, wherein that the acquisition unit obtains service data that satisfies the throughput and that comprises the label information from a data processing set based on the throughput comprises:

in response to determining that the service data does not comprise label information, obtaining, based on an idle capacity of the new block, service data that satisfies the idle capacity and does not comprise label information from the data processing set; or in response to determining that a throughput that corresponds to the label information is null, obtaining, based on an idle capacity of the new block, service data that satisfies the idle capacity and comprises the label information from the data processing set.

15. The blockchain-based data processing device according to claim 10, wherein when the receiving unit receives service data generated in the specified time period, a storage unit in the blockchain-based data processing device is configured to:

determine the data processing set that corresponds to the label information based on the label information comprised in the service data; and store the service data in the data processing set.

16. The blockchain-based data processing device according to claim 15, wherein that the acquisition unit obtains service data that satisfies the throughput and that comprises the label information from a data processing set based on the throughput comprises:

obtaining service data that satisfies the throughput based on the throughput and a timestamp of service data from the data processing set that corresponds to the label information.

17. The blockchain-based data processing device according to claim 15, wherein that the acquisition unit obtains service data that satisfies the throughput and that comprises the label information from a data processing set based on the throughput comprises:

in response to determining that an amount of service data stored in the data processing set that corresponds to the label information is less than the throughput, obtaining the service data from the data processing set based on the amount of service data stored in the data processing set.

18. The blockchain-based data processing device according to claim 10, wherein that the determining unit determines, when a new block is generated, a throughput that corresponds to the label information based on a predetermined mapping relationship between label information and throughputs comprises:

when the new block is generated, in response to determining that service data corresponds to at least two different processing priorities, determining throughputs that correspond to label information of different processing priorities, wherein a sum of throughputs that correspond to different label information is less than or equal to a storage capacity of the new block.

* * * * *